Nov. 24, 1959 W. C. GODFREY ET AL 2,914,230
FISH STRINGER
Filed June 23, 1958 2 Sheets-Sheet 1
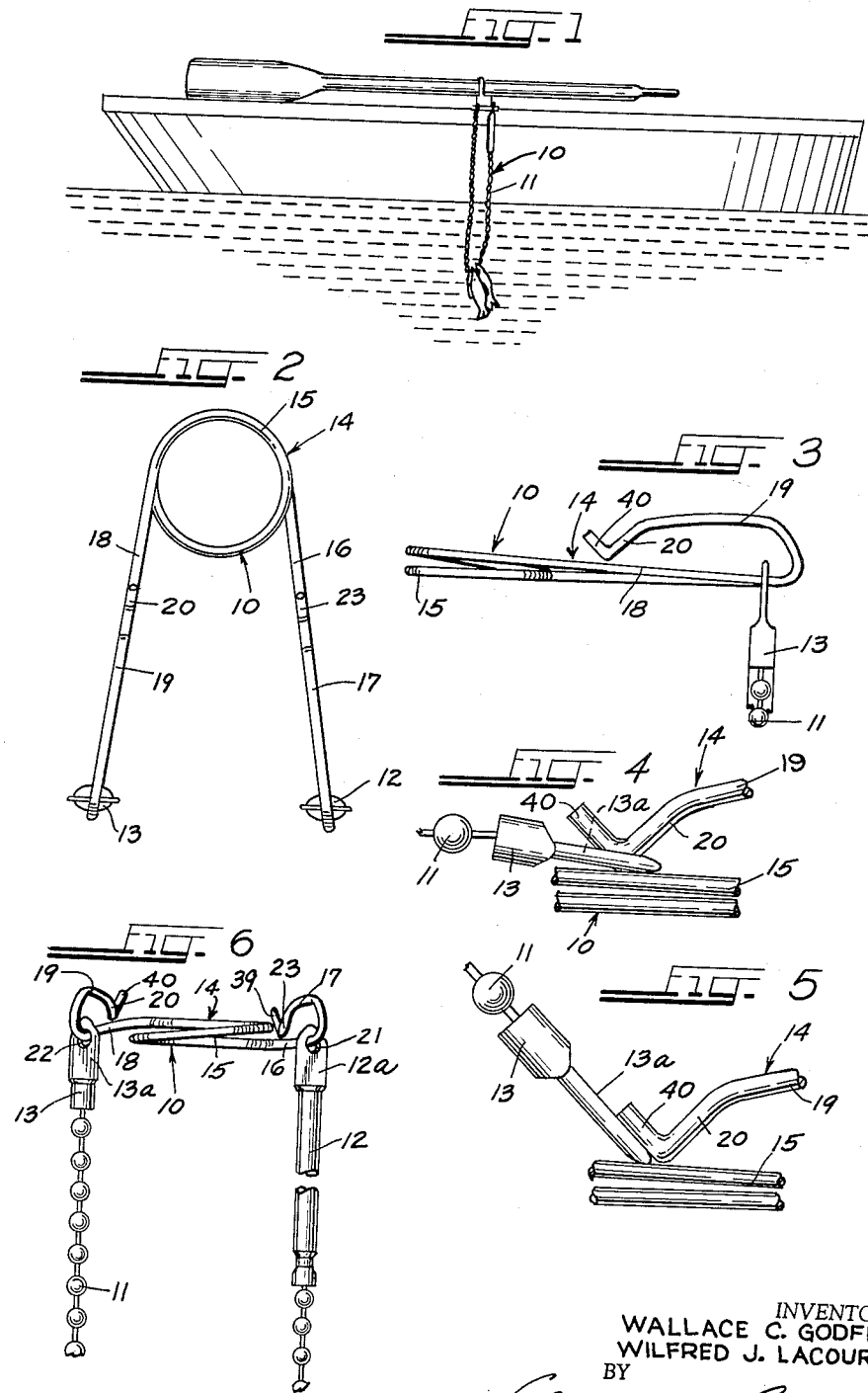
INVENTORS:
WALLACE C. GODFREY
WILFRED J. LACOURCIERE
BY
*Wallace and Cannon*
ATTYS.

Nov. 24, 1959 W. C. GODFREY ET AL 2,914,230
FISH STRINGER
Filed June 23, 1958 2 Sheets-Sheet 2
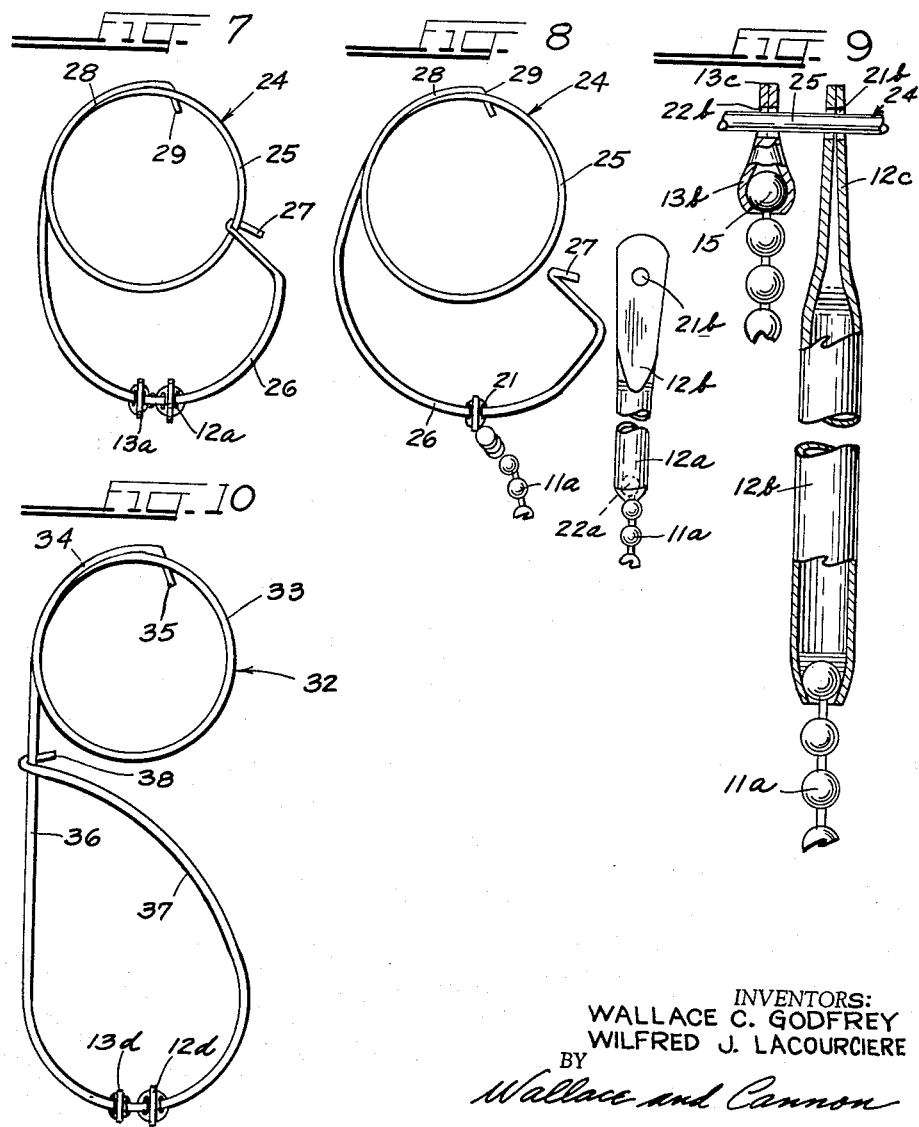
INVENTORS:
WALLACE C. GODFREY
WILFRED J. LACOURCIERE
BY United States Patent Office 2,914,230
Patented Nov. 24, 1959

2,914,230

FISH STRINGER

Wallace C. Godfrey and Wilfred J. Lacourciere, Milwaukee, Wis.

Application June 23, 1958, Serial No. 743,789

1 Claim. (Cl. 224—7)

This invention relates to a fish stringer.

An object of the invention is to provide a new and improved fish stringer embodying a novel arrangement of a beaded chain and a combination wire and latching member so constructed and arranged that the end portions of the beaded chain embodied in the fish stringer may be readily attached to and detached from the combination wire supporting and latching member when it is desired to string fish upon the chain or to remove a fish therefrom.

Another object of the invention is to provide in the new fish stringer a novel combination wire supporting and latching member which facilitates the stringing of fish upon and the removal of fish from the stringer.

A further object of the invention is to construct the new fish stringer in such a manner that the end portions of the beaded chain embodied therein are readily and securely attached to the novel combination wire supporting and latching member while being readily removable therefrom.

A further object of the construction is to construct the new fish stringer in such a manner that it is simple, efficient and inexpensive in design and construction.

Other and further objects of the present invention will be apparent from the following description and claim and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

Fig. 1 is an elevational view of a preferred form of the new fish stringer showing the same suspended from an oar lock of a rowboat;

Fig. 2 is a top plan view of the fish stringer shown in Fig. 1;

Fig. 3 is an elevational view showing the novel combination wire supporting and latching member embodied in the form of the invention shown in Figs. 1 and 2;

Fig. 4 is a fragmentary detail elevational view showing the manner in which the rear or follower end handle member of the beaded chain embodied in the new fish stringer is detachably latched to the combination wire supporting and latching member;

Fig. 5 is a fragmentary elevational view similar to Fig. 4 but showing the lead or front end handle member of the beaded chain completely unlatched from the combination wire supporting and latching member;

Fig. 6 is an elevational view showing both handle members on the beaded chain latched to the combination wire supporting and latching member;

Fig. 7 is a plan view showing a modification of the invention;

Fig. 8 is a plan view similar to Fig. 7 but showing one latching arm of the combination wire supporting and latching member detached from the central convoluted portion thereof;

Fig. 9 is a fragmentary sectional view showing the manner in which the handle members of the new fish stringer are detachably mounted on the combination wire supporting and latching member; and Fig. 10 is a plan view showing another modification of the invention.

A preferred form of the present invention is illustrated in Figs. 1 to 6, inclusive, of the drawings, wherein it is generally indicated at 10, and is shown as being detachably suspended from a suitable support, such as an oar lock of a rowboat, or the like.

The new fish stringer 10 includes a length of beaded chain 11 having a generally tubular lead end handle member 12 at one end and having a generally tubular follower or rear end handle member 13 attached thereto at its other end; the tubular handle members 12—13 being preferably made of aluminum or other light metal and being attached to the beaded chain 11 in any suitable manner, as by swedging an end portion of each handle member about one of the beads at the end of the beaded chain 11.

The lead end handle member 12 has a flattened front end portion 12a which is provided with an aperture 21, and the rear or follower end handle member 13 has a flattened aperture 13a which is provided with an aperture 22.

The new fish stringer includes a combination wire supporting and latching member 14 which includes a central convoluted portion 15 and a pair of tangentially extending arm portions 16 and 18 which extend tangentially out from the central convoluted portion 15 and somewhat divergently relative to each other (Fig. 2).

The arm 16 has a loop shaped rearwardly extending portion 17 which is bent back over the arm 16 and in the same plane therewith, and the rearwardly extending arm portion 17 has a downwardly extending end portion 23 which extends substantially down to the body of the arm 16, and thence upwardly, as at 39 (Fig. 6).

Similarly, the arm 18 has a rearwardly extending loop shaped portion 19 which is bent back reversely over the arm 18 in substantially the same plane therewith and this arm 19 has a downwardly extending portion 20 which extends down substantially into engagement with the arm 18, and thence upwardly, as at 40. (Figs. 4 and 5.) The construction of the arms 16—17—23—39 and 18—19—20—40 is similar in all respects.

The combination wire supporting and latching member 14 is preferably made of a suitable gauge of related heavy somewhat resilient spring steel wire.

In the use of the form of the invention shown in Figs. 1 to 6 inclusive, the central convoluted portion 15 of the combination wire supporting and latching member 14 may be suspended from any suitable support such, for example, as an oar lock of a rowboat, a pier port, or the like, with the flexible beaded chain 11 depending therefrom.

The flattened end portion 13a of the handle member 13 may be then detachably latched to the latching arm 18—19—20—40 by inserting the flattened end portion 13a under the somewhat resilient downwardly and thence upwardly extending end portion 20—40 of the arm 19 and between the latter and the arm 18 so as to spread the arms 18 and 19—20—40 slightly apart, whereby the apertured end portion 13a—22 of the rear follower handle member 13 may be slipped around the looped shaped portion 40—20—19 of the arm 18, by inserting the arm 40—20—19 through the aperture 22, as shown in Fig. 6.

Similarly, the front or lead end handle member 12—12a may be detachably latched to the arm 16—17—23—39 by slipping the flattened end portion 12a of the front or lead end handle member 12 under the downwardly and thence upwardly extending portion 23—39 of the arm 17 and between the latter and the body of the arm 16 so as to spread the parts 17—23—39 and 16 slightly apart, whereupon the apertured end portion 13a—22 of the rear or follower handle member 13 may be slipped around the looped shaped portion 39—23—17 of the arm 16, by inserting the arm 40—39—23—17 through the aperture 21, as shown in Fig. 6.

The upwardly extending portions 39 and 40 of the arms 17—23 and 19—20, respectively, facilitates insertion of the handle members 12—12a and 13—13a onto the arms 17—23 and 19—20, respectively.

It will be noted that the front lead end handle member 12—12a is substantially longer than the rear or follower end handle member 13—13a.

In order to string fish upon the new fish stringer the elongated front or lead end handle member 12—12a may be readily unlatched from the arm 16—17—23—39 by slipping it around the loop 17—23—39 and off the downwardly and thence upwardly extending portion 23—39 thereof, whereupon the lead or front end member 12—12a may be inserted through the gills of the fish and the front or lead end handle member 12—12a then replaced in latched position upon the latching arm 16—17—23—39, as shown.

When the generally tubular handle members 12—12a are mounted on the combination wire supporting and latching member 14 they are securely latched thereon without danger of becoming unlatched therefrom and yet they may be readily removed therefrom for the purpose of manipulating the beaded chain 11 and stringing fish thereon and removing them therefrom.

A modification of the invention is illustrated in Figs. 7 to 9, inclusive, of the drawings and in this form of the invention those parts which are similar to corresponding parts embodied in the form of the invention shown in Figs. 1 to 6, inclusive, have been given similar reference numerals followed by the additional ind distinguishing reference character "b" or "c."

In the form of the invention shown in Figs. 7 to 9, inclusive, the combination wire supporting and latching member 24 includes a central convoluted portion 25 having a flexible end portion 28 which is provided with a hook-shaped latching end portion 29 which is adapted to be latchingly engaged with the central convoluted portion 25.

Likewise, the form of the invention shown in Figs. 7 to 9, inclusive, includes a resilient arm 26 which extends tangentially from the central convoluted portion 25 and is substantially larger in diameter than the central convoluted portion 25, and is provided with a hook shaped latching end portion 27 which is adapted to latchingly engage with the central convoluted portion 25.

In the use of the form of the invention shown in Figs. 7 to 9, inclusive, the combination wire supporting and latching member 24 may be detachably mounted in position of use in the same manner as the corresponding part in the form of the invention shown in Figs. 1 to 6, inclusive. Thus, in order to mount the beaded chain 11a thereon the latching end portion 29 of the arm 28 is disengaged from the central convoluted portion 25 and the hook-shaped end portion 29 of the arm 28 is passed through the aperture 21b in the flattened front end portion 13c of the rear or follower end handle member 13b whereupon the hook-shaped end portion 29 may again be latchingly engaged with the central convoluted portion 25.

Similarly, the front or lead end handle member 12b may be latchingly engaged with the arm by detaching the hook-shaped end portion 27 from the central convoluted portion 25 and inserting it through the aperture 21b in the flattened end portion of the front or lead handle 12b and then latchingly engaging the hook-shaped end portion 27 with the central convoluted portion 25 so that the beaded chain 11a will be suspended from the combination wire supporting and latching member 24, as shown.

A further modification of the invention is shown in Fig. 10 and is therein generally indicated at 32, and these parts thereof which are similar to corresponding parts embodied in the form of the invention shown in Figs. 7 to 9, inclusive, have been given similar reference numerals followed by the addition of distinguishing reference character "d."

The form of the invention shown in Fig. 10 embodies a central convoluted portion 33 made of resilient wire, or like material, and having an arm 34 provided with a hook-shaped end portion 35 which is yieldably and latchingly engageable with the central convoluted portion 33.

The form of the invention shown in Fig. 10 also includes an arm 36 which extends tangentially from the central convoluted portion 33 and has a looped portion 37 extending reversely toward the central convoluted portion 33. Thus, a looped portion 37 has a hook-shaped end portion 38 which is latchingly engageable with the arm 36 outwardly of the central convoluted portion 33.

In the use of the form of the invention shown in Fig. 10 the rear or follower handle member 13d on the beaded chain may be latchingly engaged with the combination wire supporting and latching member 32 by disengaging the hook-shaped end portion 35 from the central convoluted portion 33 and inserting the rear handle member 13d thereon and then latchingly engaging the hook-shaped portion 35 with the central convoluted portion 33.

The lead or front end handle member 12d may then be latchingly engaged upon the loop-shaped portion 36—37 outside the central convoluted portion 33; by disengaging the hook-shaped end portion 38 from the arm 36 and slipping the apertured end portion of the front or lead handle member 12d over the hook-shaped portion 38, and around the loop 36—37, and then latchingly engaging the hook-shaped end portion 38 with the arm 36, outwardly of the central convoluted portion 33.

It will thus be seen from the foregoing description, considered in conjunction with the accompanying drawings, that the present invention provides a new and improved fish stringer and a novel combination wire supporting and latching member therefor having the desirable advantages and characteristics, and accomplishing its intended objects, including those hereinbefore pointed out and others which are inherent in the invention.

Hence, while we have illustrated and described the preferred embodiments of our invention, it is to be understood that these are capable of variation and modification.

We claim:

A fish stringer comprising: an elongated handle member, having an aperture in one end thereof forming a rim of given thickness, for insertion through the gills and mouth of a fish; a beaded flexible chain attached to said handle member at the end thereof opposite said aperture, for receiving and stringing a quantity of fish; a retainer member attached to the end of said chain opposite said handle member, said retainer member having a length very much smaller than said handle member to permit passage thereof through the gills and mouth of a fish without requiring guidance, said retainer member having an aperture therein substantially similar to the aperture in said handle member forming a rim approximately of said given thickness; and a combination supporting and latching member, formed from resilient wire, including a central substantially circular looped portion for engaging an arm of an oarlock or the like, said looped portion having two similarly directed latching and retaining arms projecting outwardly therefrom in substantially parallel spaced relation to each other, each of said arms being bent back upon itself to form a retaining loop terminating in a V-shaped latch portion with the apex of said V-shaped latch portion spaced from the main part of said arm by a distance less than said rim thickness to receive one of said handle and retainer members in releasable latched connection on said supporting and latching member.

References Cited in the file of this patent

UNITED STATES PATENTS

| | | |
|---|---|---|
| 276,945 | White | May 1, 1883 |
| 2,574,846 | Scheidt | Nov. 13, 1951 |
| 2,731,180 | Fricker et al. | Jan. 17, 1956 |
| 2,788,165 | Montgomery | Apr. 9, 1957 |
| 2,849,776 | Bahr | Sept. 2, 1958 |